United States Patent
McCullough

[15] 3,698,642
[45] Oct. 17, 1972

[54] THRUST VECTOR CONTROL SYSTEM
[72] Inventor: Edward E. McCullough, Brigham City, Utah
[73] Assignee: Thiokol Chemical Corporation, Bristol, Pa.
[22] Filed: Nov. 4, 1966
[21] Appl. No.: 592,089

[52] U.S. Cl. ............................ 239/265.23, 60/231
[51] Int. Cl. ....................................... B63h 25/46
[58] Field of Search ...... 239/265.17, 265.23; 60/230, 60/231

[56] References Cited
UNITED STATES PATENTS 3,000,178  9/1961  Logerot ............... 239/265.23
3,036,430  5/1962  Eggers et al. ......... 239/265.23

Primary Examiner—Samuel Feinberg
Attorney—Thomas W. Brennan

[57] ABSTRACT

A thrust vector control system for a rocket motor wherein a pair of rows of injection ports are provided circumferentially of the nozzle for injection of fluid thereinto. Means for selectively varying the rate of flow of the fluid injected thereby creating a nonstructural, variable positioned throat to vary thereby the direction of the rocket motor thrust vector.

4 Claims, 2 Drawing Figures

PATENTED OCT 17 1972 3,698,642

INVENTOR.
EDWARD E. McCULLOUGH

BY

Edward R. Grant
ATTORNEY

THRUST VECTOR CONTROL SYSTEM

This invention relates to rocket motors and more particularly to a thrust vector control system for rocket motors.

The flight path of a rocket motor has heretofore been controlled by various means, among the most efficient of which is the so-called secondary injection thrust vector control method. A rocket control system of this type is described in U.S. Pat. No. 3,273,801. The present invention provides an improved system whereby the thrust vector of a rocket motor is controlled by varying the flow of fluid through two rows of ports in the wall of the thrust nozzle of said rocket motor affording greater mechanical advantage, as will be more fully explained below.

Accordingly, it is an object of this invention to provide an improved thrust vector control system for a rocket motor.

Another object of this invention is to provide a thrust vector control system having no moving parts exposed to propellant gases.

Figure 1:
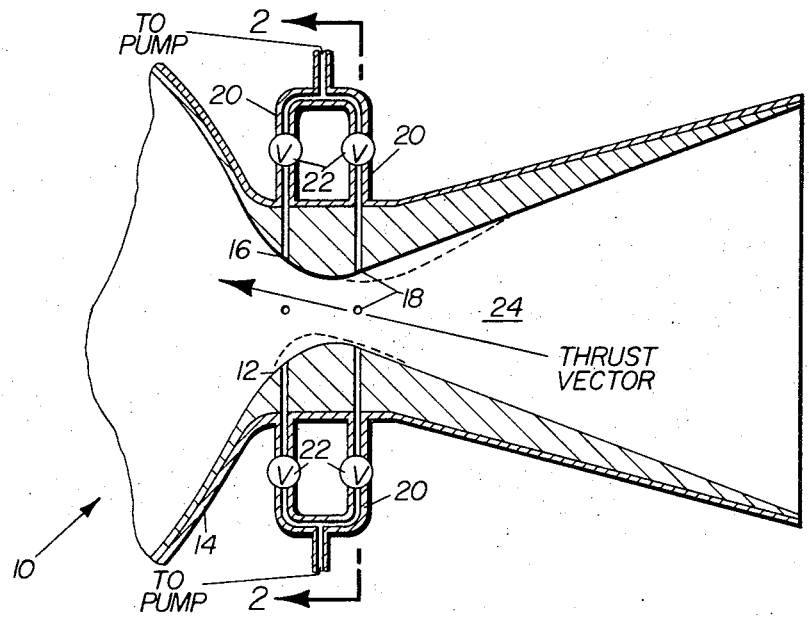
Figure 2:
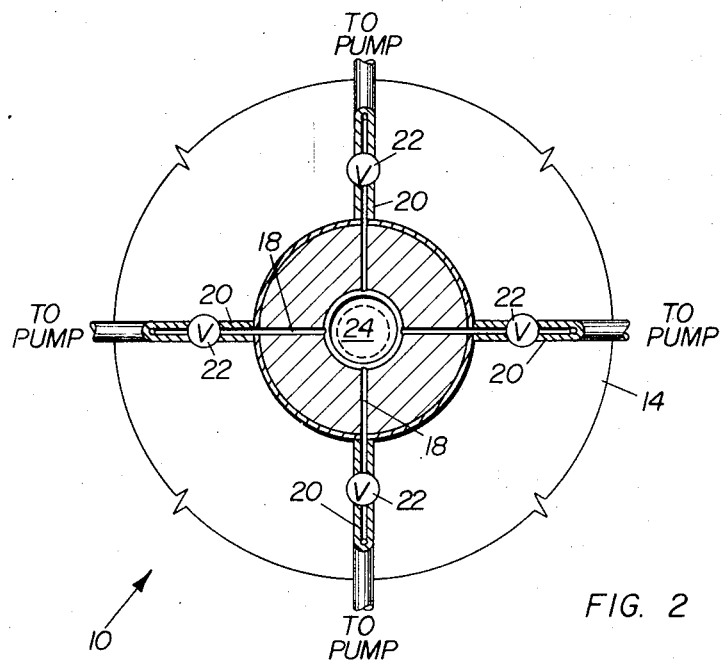

The invention will be more readily understood by consideration of the following description of a preferred embodiment thereof, in which description reference is made to the accompanying drawing wherein:

FIG. 1 is a fragmentary longitudinal sectional view of the aft end of a rocket motor incorporating the preferred embodiment of the invention; and FIG. 2 is a cross-sectional view of the same rocket, taken along the plane represented by line 2—2 in FIG. 1 and in the indicated direction.

Throughout the specification and the drawings, like reference numbers designate like parts.

As illustrated in FIG. 1, a preferred embodiment of the invention comprises a rocket motor, generally designated by the number 10, which has a convergent-divergent nozzle 12 mounted on the aft end of its casing 14. For the purpose of interpretation of the claims appended hereto, the throat plane of the nozzle is defined as that plane perpendicular to the longitudinal axis of nozzle 12 at the point of the greatest constriction of said nozzle. Thrust nozzle 12 is provided with a first row of four ports 16, each of which extends through the wall of said nozzle and is spaced apart at equal distances circumferentially thereof. Further, each of said ports is equidistant longitudinally from the throat plane of said nozzle.

Thrust nozzle 12 is also provided with a second row of ports 18, each of which extends through the wall of said nozzle and is spaced apart at equal distances circumferentially thereof. Further, the ports of said second row are spaced equidistant longitudinally from the ports of said first row. Although in the embodiment illustrated the first row of ports is upstream and the second row of ports is downstream from the throat plane of nozzle 12, it is to be understood that in other embodiments both rows can be either upstream or downstream of said throat plane, or one of said rows can be located at said throat plane.

Four ducts 20 are communicatively connected to respective ones of the ports 16, 18. A valve 22 is disposed in each duct to control fluid flow through the duct. Fluid is provided by conventional pump means not shown. Thus, during flight of the rocket fluid from the pump can be delivered through any selected duct or through all ducts simultaneously at different flow rates and pressures controlled by valves 22. As will be understood by those familiar with the art of secondary injection, flow of fluid through ports 16 and 18 creates shock waves which form a gaseous, non-structural throat 24, illustrated in FIGS. 1 and 2 by broken lines. When the injected fluid is directed against the propellant gas stream with equal force from all ports 16 and 18, the nonstructural throat will be concentric about the longitudinal axis of nozzle 12. However, by controlling the fluid flow through one or more ports the non-structural throat can be located in any position and can be tilted with respect to the longitudinal axis of nozzle 12. For example, as illustrated in FIGS. 1 and 2, flow can be terminated in one of the ports of the first row and the flow through the other ducts regulated to form a nonstructural throat located and tilted as shown, changing the thrust vector of the rocket motor so that the rocket will pitch downward. Those skilled in the art will recognize that the invention can be utilized to move the rocket in other directions, to change its velocity, and to rotate it about its axis, the latter requiring at least two motors, or two thrust nozzles equipped with the invention.

The fluid injected through the ports can be a liquid or a gas. Preferably the fluid is an inert gas, such as helium, but either a reactive gas or a liquid can be used.

While a preferred embodiment of the invention has been described and illustrated, it will be understood that various modifications and changes may be made within the scope of the invention. For example, thrust vector control may be achieved in accordance with the invention by a system having three ports in each row rather than four.

What is claimed is:

1. In a rocket motor having a convergent-divergent nozzle for expelling combustion gases produced in said motor, the thrust vector control system comprising:

a first row of flow parts extending through the wall of said nozzle, spaced apart circumferentially thereof and oriented therein so as to provide a direction of entry of fluid flowing through said ports into said nozzle normal to the longitudinal axis of said motor, each of said ports being spaced equidistant longitudinally from the throat plane of said nozzle;

a second row of ports extending through the wall of said nozzle, spaced apart circumferentially thereof and oriented therein so as to provide a direction of entry of fluid flowing through said ports into said nozzle normal to the longitudinal axis of said motor, the ports of said second row being spaced equidistant longitudinally from the ports of said first row;

a plurality of ducts each communicatively connected to a respective one of said ports;

means for causing fluid to flow under pressure in said ducts and through said ports; and, valve means in each of said ducts for selectively varying said fluid flowing through said ports, said fluid thereafter acting upon said rocket motor combustion gases so as to form a nonstructural throat therearound, said throat tiltable with respect to said longitudinal axis in response to said selectively varied fluid flowing into said nozzle through said ports.

2. The thrust vector control system defined in claim 1 wherein each of said first and second rows includes at least three ports circumferentially spaced equidistant from each other.

3. The thrust vector control system defined in claim 1 wherein said fluid is a gas and said means for causing said fluid to flow under pressure comprises a pump.

4. A method for controlling the thrust vector of a rocket motor having a convergent-divergent nozzle for expelling combustion gases produced in said motor comprising the steps of:

injecting fluid into said nozzle in a direction normal to the longitudinal axis of said motor through a first row of ports extending through the wall of said nozzle and spaced apart circumferentially thereof, each of said ports being spaced equidistant longitudinally from the throat plane of said nozzle;

injecting fluid into said nozzle in a direction normal to the longitudinal axis of said motor through a second row of ports extending through the wall of said nozzle and spaced apart circumferentially thereof, the ports of said second row being spaced equidistant longitudinally from the ports of said first row; selectively varying the rate of flow of said fluid through said ports; and directing said fluid leaving said ports in a direction normal to said motor longitudinal axis, said fluid thereafter acting on said combustion gases so as to form a nonstructural throat therearound, said throat tiltable with respect to the longitudinal axis of said motor.

* * * * *